United States Patent
Fleming et al.

(10) Patent No.: US 8,934,561 B2
(45) Date of Patent: Jan. 13, 2015

(54) CELL CLUSTERING AND APERTURE SELECTION

(75) Inventors: Phil Fleming, Glen Ellyn, IL (US);
Shirish Nagaraj, Hoffman Estates, IL (US); Alan Rottinghaus, Barrington, IL (US); Roy Yang, Buffalo Grove, IL (US); Yuda Luz, Buffalo Grove, IL (US); David Baietto, Crystal Lake, IL (US)

(73) Assignee: Nokia Siemens Networks OY, Espoo (FI)

( * ) Notice: Subject to any disclaimer, the term of this patent is extended or adjusted under 35 U.S.C. 154(b) by 86 days.

(21) Appl. No.: 13/524,357

(22) Filed: Jun. 15, 2012

(65) Prior Publication Data
US 2013/0170574 A1  Jul. 4, 2013

Related U.S. Application Data

(60) Provisional application No. 61/580,776, filed on Dec. 28, 2011.

(51) Int. Cl.
*H04L 1/02* (2006.01)

(52) U.S. Cl.
USPC .......................................................... 375/267

(58) Field of Classification Search
USPC ................................................ 375/267, 260
See application file for complete search history.

(56) References Cited

U.S. PATENT DOCUMENTS

| | | | |
|---|---|---|---|
| 7,139,539 B2 | 11/2006 | Chun | 455/127.1 |
| 2008/0300004 A1 | 12/2008 | Balachandran et al. | 455/522 |
| 2009/0027260 A1 | 1/2009 | Runyon et al. | 342/352 |
| 2009/0075618 A1* | 3/2009 | Ghassemzadeh et al. | 455/277.1 |
| 2010/0002657 A1 | 1/2010 | Teo et al. | 370/336 |
| 2010/0027456 A1* | 2/2010 | Onggosanusi et al. | 370/312 |
| 2010/0056215 A1* | 3/2010 | Gorokhov et al. | 455/561 |
| 2010/0144334 A1* | 6/2010 | Gorokhov et al. | 455/418 |
| 2010/0232336 A1 | 9/2010 | Choudhury et al. | 370/312 |

(Continued)

FOREIGN PATENT DOCUMENTS

| | | |
|---|---|---|
| EP | 0709974 A1 | 5/1996 |
| EP | 1133205 A2 | 9/2001 |

(Continued)

OTHER PUBLICATIONS

Federico Boccardi, Howard Huang and Angeliki Alexiou, "Network MIMO with reduced backhaul requirements by MAC coordination", IEEE 2008.*

(Continued)

*Primary Examiner* — Khai Tran
(74) *Attorney, Agent, or Firm* — Harrington & Smith

(57) ABSTRACT

A method is disclosed that includes accessing baseband information for a number, N (N>1), of antennas accessible by a number of baseband units, where the baseband information correspond to a transmission by a user equipment and is received at the N antennas. The method includes determining values for one or more metrics for the baseband information for the N antennas. The method includes selecting, based on the determined values, a subset k of the N antennas and corresponding baseband information to use to determine output data for the transmission by the user equipment. The method includes determining the output data for the user equipment using the baseband information from the k antennas. Apparatus and computer program products are also disclosed.

23 Claims, 8 Drawing Sheets

(56) References Cited

U.S. PATENT DOCUMENTS

| | | | | |
|---|---|---|---|---|
| 2010/0265813 | A1* | 10/2010 | Pereira et al. | 370/201 |
| 2010/0323611 | A1 | 12/2010 | Choudhury | 455/7 |
| 2011/0080879 | A1 | 4/2011 | Grant | 370/329 |
| 2011/0275397 | A1* | 11/2011 | Guey et al. | 455/509 |
| 2011/0281591 | A1* | 11/2011 | Wang et al. | 455/452.2 |
| 2011/0287791 | A1* | 11/2011 | Fujishima et al. | 455/500 |
| 2012/0002750 | A1 | 1/2012 | Hooli et al. | 375/295 |
| 2012/0114050 | A1* | 5/2012 | Osterling | 375/259 |
| 2012/0134279 | A1 | 5/2012 | Tamaki | 370/248 |
| 2012/0149411 | A1* | 6/2012 | Miyoshi et al. | 455/501 |
| 2012/0224541 | A1* | 9/2012 | Yoshiuchi et al. | 370/329 |
| 2012/0314665 | A1 | 12/2012 | Ishida et al. | 370/329 |
| 2013/0021925 | A1* | 1/2013 | Yin et al. | 370/252 |
| 2013/0040671 | A1 | 2/2013 | Zawaideh et al. | 455/500 |
| 2013/0136068 | A1 | 5/2013 | Johansson et al. | 370/329 |
| 2013/0142054 | A1 | 6/2013 | Ahmadi | 370/252 |
| 2013/0170574 | A1 | 7/2013 | Fleming et al. | 375/267 |
| 2013/0172050 | A1* | 7/2013 | Fleming et al. | 455/562.1 |

FOREIGN PATENT DOCUMENTS

| | | |
|---|---|---|
| EP | 1296466 A | 3/2003 |
| EP | 1954075 A1 | 8/2008 |
| EP | 2 197 221 A1 | 6/2010 |
| EP | 2381587 A1 | 10/2011 |
| EP | 2541823 A1 | 1/2013 |
| GB | 2367984 A | 4/2002 |
| KR | 100785105 B1 | 12/2007 |
| WO | WO-2009036636 A1 | 3/2009 |

OTHER PUBLICATIONS

Laetitia Falconetti, Christian Hoymann, Rohit Gupta "Distributed Uplink Macro Diversity for Cooperating Base Stations", IEEE 2009.*

Nokia Siemens Networks, "Liquid Radio, Let traffic waves flow most efficiently", www.nokiasiemensnetworks.com/file/13456/liquid-radio?download; Feb. 6, 2012, 12 pgs.

Erik G. Larsson, "Robust Structured Interference Rejection Combining", Wireless Communications and Networking Conference, IEEE, vol. 2, pp. 922-926, 2005.

Gesbert et al., "Shifting the MIMO Paradigm", IEEE Signal Processing Magazine, pp. 36-46, Sep. 2007.

Marsch, et al., "Field Trial Results on Different Uplink Coordinated Multi-Point (CoMP) Concepts n Cellular Systems", 2010 International ITG Workshop on Smart Antennas (WSA), 6 pgs., Feb. 23-24, 2010.

Parkvall et al., "LTE-Advanced-Evolving LTE towards IMT-Advanced", IEEE Vehicular Technology Conference, 5 pgs., 2008.

Parkvall et al., "The Evolution of LTE towards IMT-Advanced", Journal of Communications, vol. 4, No. 3, 9 pgs., Apr. 2009.

Quek, et al., "Uplink Coordinated Multi-Point ARQ in MIMO Cellular Systems", The Institute of Electronics, Information and Communication Engineers, IEICE Trans., Commun., vol. E94-B, No. 12, pp. 3211-3224, Dec. 2011.

Nokia Siemens Networks, "Liquid Radio, Let traffic waves flow most efficiently", www.nokiasieinensnetworks.com/file/13456/liquid-radio?download; Feb. 6, 2012, 12 pgs.

Zheng, et al., "Uplink Coordinated Multi-Point for LTE-A in the Form of Macro-Scopic Combining", IEEE Vehicular Technology Conference (VTC), 5 pgs., 2010.

Jolly Parikh, "LTE Advanced: The 4G Mobile Broadband Technology", International Journal of Computer Applications, vol. 13, No. 5, pp. 17-21, Jan. 2011.

"3$^{rd}$ Generation Partnership Project; Technical Specification Group Radio Access Network; Evolved Universal Terrestrial Radio Access (E-UTRA); Physical Channels and Modulation (Release 10)", 3GPP TS 36.211 V10.4.0, 101 pgs., Dec. 2011.

Luz, Y. et al.; "Antenna Clustering for Multi-Antenna Aperture Selection"; U.S. Appl. No. 13/649,484, filed Oct. 11, 2012; whole document (23 pages).

Boccardi, Federico, et al., "Network MIMO with reduced backhaul requirements by MAC coordination", IEEE 2008, pp. 1125-1129.

Falconetti, Laetitia, et al., "Distributed Uplink Macro Diversity for Cooperating Base Stations", IEEE 2009, 5 pgs.

* cited by examiner

CELL CLUSTERING AND APERTURE SELECTION

CROSS-REFERENCE TO RELATED APPLICATIONS

The present application claims the benefit under 35 U.S.C. §119(e) of U.S. Provisional Patent Application No. 61/580,776, filed on Dec. 28, 2011, the disclosure of which is hereby incorporated by reference in its entirety.

TECHNICAL FIELD

This invention relates generally to wireless networks and, more specifically, relates to multiple antenna configurations and processing in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

AMU antenna management unit
BBU baseband unit
CPRI common public radio interface
DL downlink (from base station to UE)
DSP digital signal processor
FDD frequency division duplex
ID identification
I/F interface
IRC interference rejection combining
LTE long term evolution
Mbps megabits per second
MHz mega-Hertz
OBSAI open base station architecture initiative
RF radio frequency
RRH remote radio head or remote RF head
SINR signal-to-interference noise ratio
UE user equipment
UL uplink (from UE to base station)

In places with a very high density of data subscribers in a wireless system, it is difficult for the operator of the system to provide an adequate data rate to each subscriber. For example, in a stadium sporting event, there can be many thousands of spectators. Spectators can be as dense as 1.5 per square meter. Suppose half of the spectators are subscribers to a given wireless service and one percent of those are asking for a download or upload simultaneously. This is admittedly a "peak" scenario but not too extreme. If the users expect a 1 Mbps (megabits per second) data rate, a cell (typically 10 Mbps/cell downlink for 10 MHz FDD-LTE) would be able to support about 200 spectators seated in an area of 133 square meters. Note that 133 square meters is roughly the area of a circle of radius 6.5 m. With cells packed this densely, cell-edge effects become dominant.

Even provided with many low power antennas and corresponding receivers and/or transmitters, a wireless system can be easily overwhelmed by this amount of traffic. Conversely, increasing capacity through additional hardware can be expensive or impossible. It would be beneficial to provide the ability to use currently installed hardware to improve wireless capacity.

SUMMARY

This section contains examples of possible embodiments.

In one example, a method is disclosed that includes accessing baseband information for a plurality, N, of antennas accessible by a plurality of baseband units, the baseband information corresponding to a transmission by a user equipment and received at the N antennas, and determining values for one or more metrics for the baseband information for the N antennas. The method includes selecting, based on the determined values, a subset k of the N antennas and corresponding baseband information to use to determine output data for the transmission by the user equipment, and determining the output data for the user equipment using the baseband information from the k antennas.

In an additional exemplary embodiment, an apparatus is disclosed that includes one or more processors and one or more memories including computer program code. The one or more memories and the computer program code are configured, with the one or more processors, to cause the apparatus to perform at least the following: accessing baseband information for a plurality, N, of antennas accessible by a plurality of baseband units, the baseband information corresponding to a transmission by a user equipment and received at the N antennas; determining values for one or more metrics for the baseband information for the N antennas; selecting, based on the determined values, a subset k of the N antennas and corresponding baseband information to use to determine output data for the transmission by the user equipment; and determining the output data for the user equipment using the baseband information from the k antennas.

In a further example, a computer program product is disclosed that includes a computer-readable memory medium bearing computer program code embodied therein for use with a computer. The computer program code includes the following: code for accessing baseband information for a plurality, N, of antennas accessible by a plurality of baseband units, the baseband information corresponding to a transmission by a user equipment and received at the N antennas; code for determining values for one or more metrics for the baseband information for the N antennas; code for selecting, based on the determined values, a subset k of the N antennas and corresponding baseband information to use to determine output data for the transmission by the user equipment; and code for determining the output data for the user equipment using the baseband information from the k antennas.

In yet another example, an apparatus includes the following: means for accessing baseband information for a plurality, N, of antennas accessible by a plurality of baseband units, the baseband information corresponding to a transmission by a user equipment and received at the N antennas; means for determining values for one or more metrics for the baseband information for the N antennas; means for selecting, based on the determined values, a subset k of the N antennas and corresponding baseband information to use to determine output data for the transmission by the user equipment; and means for determining the output data for the user equipment using the baseband information from the k antennas.

DETAILED DESCRIPTION OF THE DRAWINGS

As described above, there are problems associated with densely packed cells. Exemplary embodiments of the instant invention provide solutions for the uplink side of this problem. An exemplary embodiment first provides each cell access to a group of antennas and allows those groups of antennas to overlap with other groups of antennas. Second, for each scheduled UE, the receiver in the UE's cell will select the best subset of antennas from the group of antennas on which to run its receiver. Continuing the example presented above, suppose there are 16 cells in the stadium with two antennas each (offering a total of 32 antennas e.g., M) and suppose that the baseband unit(s) (BBUs) and antennas are wired so that for each UE, the BBU has access to 12 (e.g., N) antennas (or, depending on implementation, sometimes even more) that are placed near the cell where the UE is attached. The BBU then selects the best 8 (e.g., k) antennas out of the 12 (e.g., N) antennas to run its receiver, where k<N<M. An exemplary selection algorithm uses pre-combined SINR as its primary selection metric. That is, the digitized signal from each antenna is channel estimated so that accurate SINR can be measured individually. Other possible metrics include: received signal strength, sounding (SRS, sounding reference signals), and the like, which may be combined with or used in lieu of SINR.

In an exemplary embodiment, once the best k<N antennas are selected, an IRC combiner is used to provide the post-combined signal. Since only best antennas were selected, the post combined signal is expected to have a superior SINR compared to any of the individual pre-combined signals.

Figure 1:
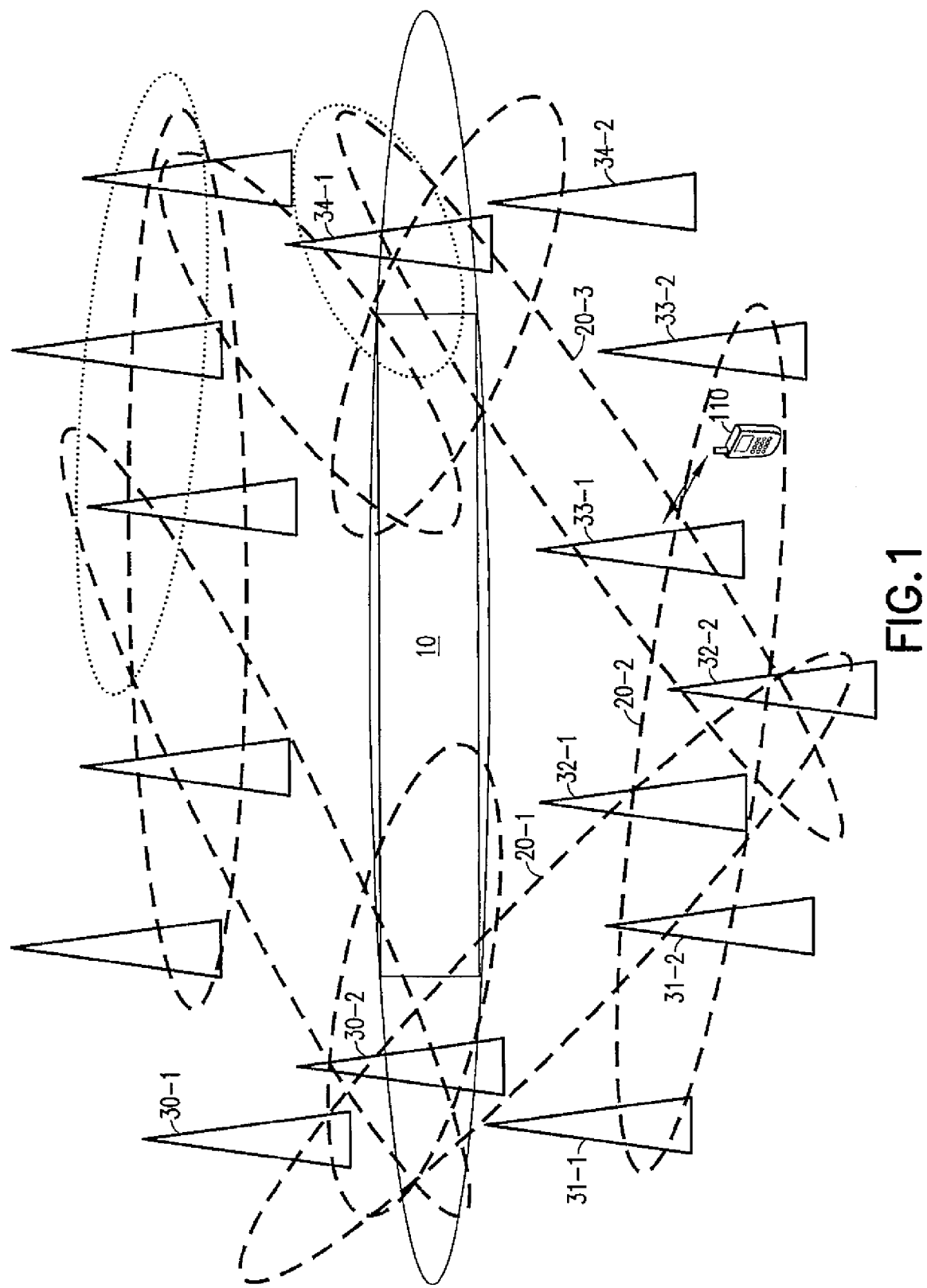
FIG. 1 is a diagram of an aperture selection example using aperture apparatus.

Turning now to FIG. 1, this figure shows a diagram of an aperture selection example using aperture apparatus. Only some of the cells (illustrated as towers in this example) are discussed herein, but the cells are shown in a stadium having a field 10. The cells are densely spaced and surround the field 10. Each pair of cells (30-1 and 30-2; 31-1 and 31-2; 32-1 and 32-2; 33-1 and 33-2; and 34-1 and 34-2) is directly attached to one BBU (not shown in this figure). Each "group" 20-1, 20-2, or 20-3 includes three pairs of cells. For instance, group 20-1 includes pairs of cells 30, 31, and 32; group 20-2 includes pairs of cells 31, 32, and 33; group 20-3 includes pairs of cells 32, 33, and 34. The groups 20 overlap two pairs with their neighbor groups (e.g., pairs of cells 32 are in groups 20-1, 20-2, and 20-3). Each cell is a member of multiple groups. Each UE 110 is attached to a cell in one of the groups. In this example, UE 110 is attached to cell 33-1. In this example, the UE's signal is processed by the best two pairs (four cells) of the three pairs (six cells) in a group. Examples of this processing are described in more detail below.

Figure 2:
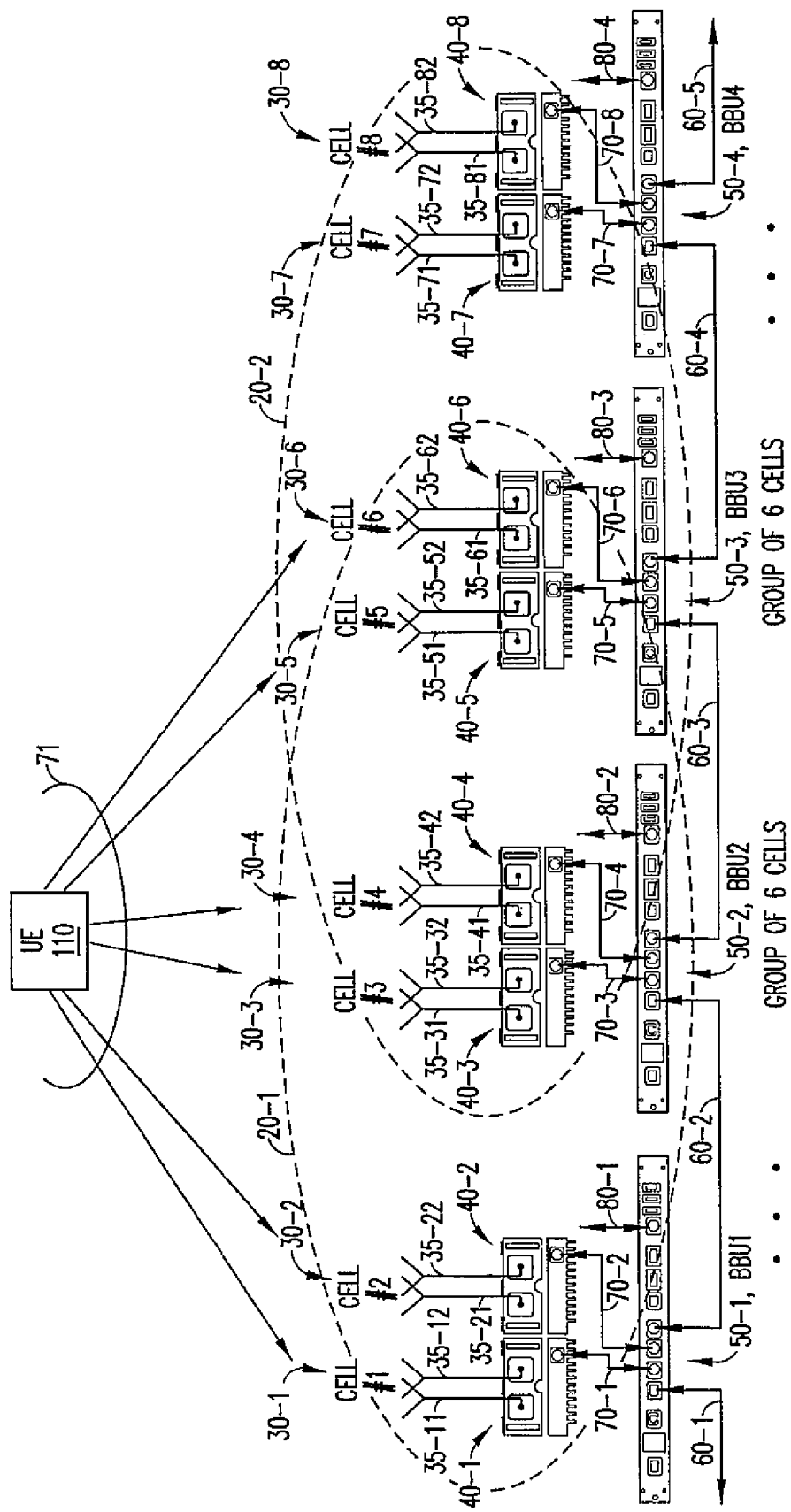
FIG. 2 is an example of a scalable baseband grouping apparatus.

Referring to FIG. 2, an example is shown where there are two groups 20-1 and 20-2, each group 20 having six cells 30. It is noted that there can be more than two groups 20 assigned to this apparatus, but only two groups 20 are illustrated in FIG. 2. Group 20-1 has cells 30-1 through 30-6, and group 20-2 has cells 30-3 through 30-8. Two-antenna cells 30 are directly connected to each baseband unit (BBU) 50 via two remote radio heads (RRHs) 40 and two links 70. Links 70 may implement, e.g., an open base station architecture initiative (OBSAI) I/F (interface) and/or a common public radio interface (CPRI) I/F. Both standards are commonly used in the industry. The links 70 typically supports greater than 6 Gbps (gigabits per second) data transfer using copper line for short distance or fiber optics for long distances. Each BBU 50 has access to six cells 30 through its immediate neighbors via links 60. Links 60 in an exemplary embodiment are optical fiber links, and the links use an "RP3-01" physical interface standard that carries the antenna receive (and transmit) signals. Each RRH 40 and cell 30 has two antennas 35 in this example: RRH 40-1 has antennas 35-11 and 35-12; RRH 40-2 has antennas 35-21 and 35-22; RRH 40-3 has antennas 35-31 and 35-32; RRH 40-4 has antennas 35-41 and 35-42; RRH 40-5 has antennas 35-51 and 35-52; RRH 40-6 has antennas 35-61 and 35-62; RRH 40-7 has antennas 35-71 and 35-72; and RRH 40-8 has antennas 35-81 and 35-82. The group 20-1, marked as a dashed line ellipse in FIG. 2, has antennas 35-11 through 35-62 and the group 20-2 has antennas 35-31 through 35-82. This apparatus enables cooperative transmitter/receiver algorithms, as is described below.

Figure 3:
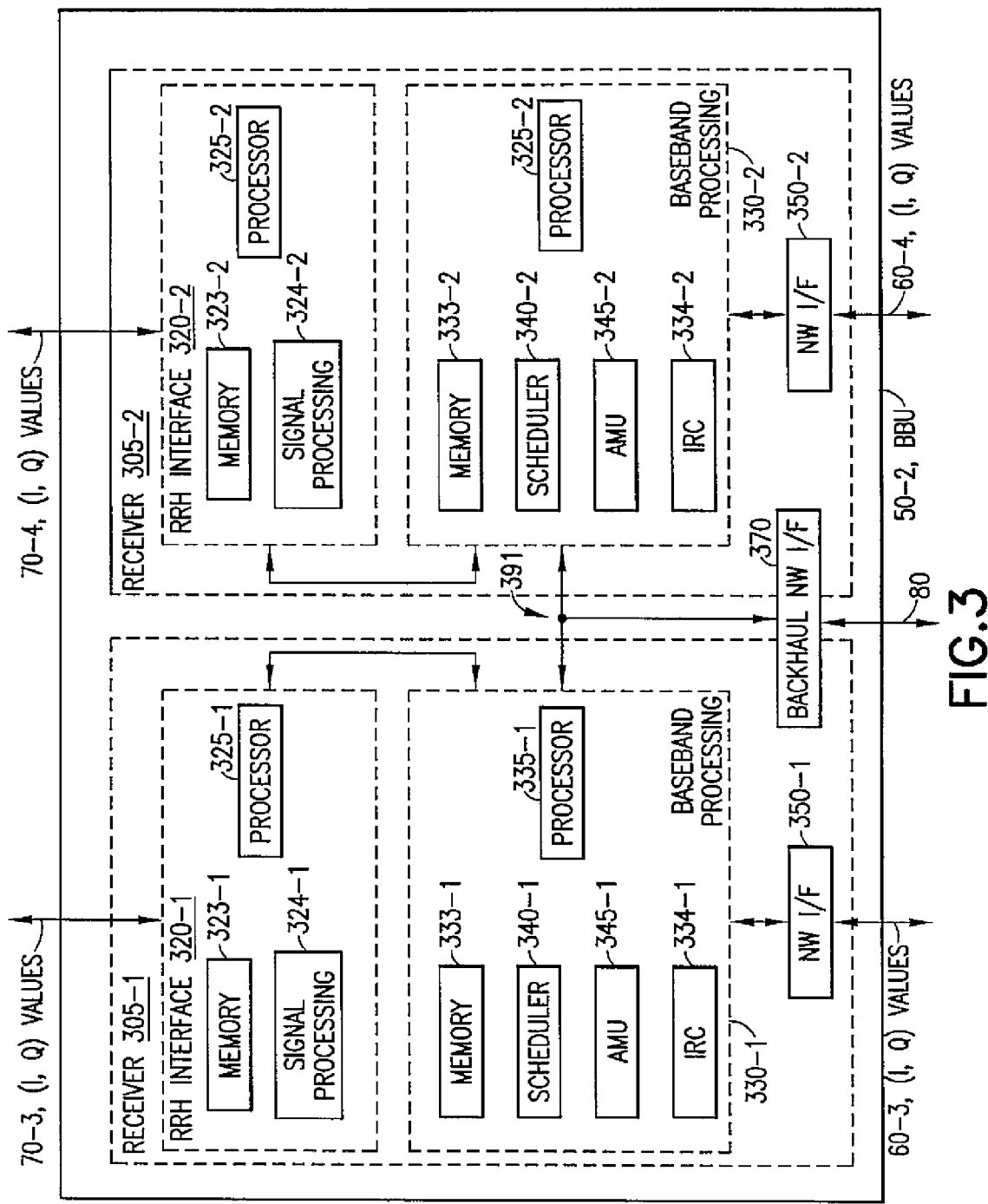
FIG. 3 is an example of a baseband unit.

Turning also to FIG. 3, each BBU 50 (BBU 50-2 is shown in this example, but the other BBUs 50 are assumed to be similar) includes two receivers 305-1, 305-2, which are connected to respective RRHs 40-3, 40-4 (and therefore cells 30-3, 30-4, respectively). Each receiver 305 includes a scheduler 340 and an antenna management unit (AMU) 345. Each receiver 305 is connected to the links 70 and 60 and also to a backhaul link 80. Backhaul links 80 are connected to core network elements (not shown).

In an example, the cells 30 are spatially distributed in a stadium. It is noted that a stadium is used herein in the examples, but the instant invention has broader applicability than stadiums. For instance, any time there are cells that are densely packed, for instance, 10 per sq. km (square kilometer) or more, the exemplary embodiments may be used. In stadiums, "densely packed" could be 1000 cells per sq. km or more. In the example of FIG. 2, here is one RRH 40 per cell 30, with two antennas 35 per RRH 40. In the uplink in this example, a receiver uses IRC (interference rejection combining) on information from the "best" eight out of 12 antennas. The eight best antennas are determined, e.g., by SINR and are determined in an example by an AMU 345. The system shown in FIG. 2 may also use 4-way MU-MIMO. In downlink, 2×2 MIMO may be used, and this may evolve to cooperative downlink with joint transmission. In terms of vertical scalability, additional RRHs per BBU 50 may be added.

In this example, the receivers 305 in each BBU 50, once the receivers have processed the antenna information from directly their own RRH 40, and also indirectly from their neighboring RRHs via link 60, and once the post combined signal is decoded, the receivers become dedicated to a single cell 30, and there is one scheduler 340 per receiver 305. The schedulers 340 and receivers 305 dedicated to each cell 30 operate independently. For instance, a scheduler 340-1 and receiver 305-1 in BBU 50-2 dedicated to cell 30-3 operate independently from a scheduler 340-2 and receiver 305-2 in BBU 50-2 dedicated to cell 30-4.

The UE 110 in an example is attached to cell #3 (30-3) and a signal 71 is sent from the UE 110 using resources scheduled by a scheduler for the RRH 40-3. Versions of the signal 71 are received at each of the cells 30-1 through 30-6 (and also at cells 30-7 and 30-8, although this is not shown in the figure). In an exemplary embodiment, each BBU 50 "sees" the signal from all of the antennas that are directly or indirectly (over the fiber from the neighbor BBUs) connected to the BBU 50 and is able to use those signals to decode each UE. Thus, the cells share the antenna information. This avoids collisions between UEs, because the "colliding" UE signal is known to the receiver and therefore can be "rejected" by the receiver. Because the UE 110 is attached to cell 30-3, the signal 71 transmits data corresponding to the cell ID for cell 30-3. Each receiver 305 for a cell 30 looks for data corresponding to its own cell ID, and therefore the only receiver 305 going to look for data corresponding to a cell ID for cell 30-3 is the receiver 305-1.

However, each receiver 305/BBU 50 in the group 20-1 receives information from the signal 71 using a corresponding antenna 35. Each of the receivers 305/BBUs 50 in a group 20 multiplexes received information over corresponding links 60 to send the received information to the other receivers 305/BBUs 50 in the group 20. In an example, (I,Q) values are multiplexed and sent. For instance, the cell 30-3 receives the signal 71 and the receiver 305-1 receives, e.g., (I, Q) values over the link 70-3. Each receiver 305 corresponding to a cell 30-1 and 30-2 multiplexes information received in uplink to the cell 30-3 using link 60-2. That is, the receiver 305 for cell 30-1 multiplexes information received using antenna 35-11 and information received using antenna 35-12 to the cell 30-3 using link 60-2. The receiver 305 for cell 30-2 multiplexes information received using antenna 35-21 and information received using antenna 35-22 to the cell 30-3 using link 60-2. The receiver 305-2, corresponding to cell 30-4, sends information received in uplink to the cell 30-3 (e.g., using one or more internal buses of the BBU 50-2). Each receiver 305 corresponding to a cell 30-5 and 30-6 multiplexes information received in uplink to the cell 30-3 using link 60-3. That is, the receiver 305 for cell 30-5 multiplexes information received using antenna 35-51 and information received using antenna 35-52 to the cell 30-3 using link 60-3. The receiver 305 for cell 30-6 multiplexes information received using antenna 35-61 and information received using antenna 35-62 to the cell 30-3 using link 60-3.

Thus, the receiver 305-1 for cell 30-3 has received information from all twelve antennas 35-11 through 35-62. The receiver 305-1 (e.g., the AMU 345-1 in the receiver 305-1) can select from the twelve antennas which antennas to use to process the received information and to create (e.g., using IRC of order 8 on the information from the selected antennas) output information accordingly. Examples of IRC are presented in Erik G. Larsson, "Robust Structured Interference Rejection Combining", Wireless Communications and Networking Conference, IEEE, 922-926 Vol. 2 (2005).

In the group 20-1, each of the receivers 305-1 and 305-2 corresponding to the cells 30-3 and 30-4 receives information from other receivers 305 in the BBUs 50-1, 50-2, and 50-3 and processes this information for aperture selection. Therefore, the receivers 305 for cells 30-3 and 30-4 may be considered aperture processing receivers for the group 20-1. These receivers 305-1 and 305-2 do not send received information to the other receivers 305 for the cells 30-1, 30-2, 30-5 and 30-6 in the group 20-1. As explained below, cells 30-3 and 30-4 would forward their antenna data to cells 30-5 and 30-6, not for the purpose of processing group 20-1, but for the purpose of processing group 20-2. Thus, the receivers 305-1 and 305-2 in cells 30-3 and 30-4 actually send their received (e.g., (I,Q)) data onwards to the neighboring BBUs (BBU1 and BBU3) to support all of the groups to which these antennas belong. In this manner, each BBU has complete access to the antennas that are connected to the BBUs and that are connected to the two adjacent BBUs (in this example). However, the receiver 305-1 exchanges received information from antennas 35-31 and 35-32 with the receiver 305-2, and conversely the receiver 305-2 exchanges received information from antennas 35-41 and 35-42 with the receiver 305-1. The receivers 305-1 and 305-2 also receive information from all other cells (30-1, 30-2, 30-5, and 30-6) in the group 20-1.

In the group 20-2, the receivers 305 in the cells 30-5 and 30-6 are the aperture processing receivers for this group 20-2, and the other receivers 305 corresponding to the cells 30-3, 30-4, 30-7, and 30-8 send received information corresponding to each of their antennas 35 to the aperture processing receivers (and the receiver 305 for the cell 30-5 sends information received from antennas 35-51 and 35-52 to the receiver 305 for the cell 30-6, and the receiver 305 for the cell 30-6 sends information received from antennas 35-61 and 35-62 to the receiver 305 for the cell 30-5). There are other groups 20 that may also be formed, such as having the receivers 305 for the cells 30-7 and 30-8 be the aperture processing receivers for a group includes BBUs 50-3, 50-4, and a BBU 50-5 (not shown but connected to link 60-5). Another group 20 may be formed using the receivers 305 for the cells 30-1 and 30-2 as the aperture processing receivers for a group including BBUs 50-1, 50-2, and a BBU 50-0 (not shown but connected to link 60-1). Further, this system may be circular, in that links 60-1 and 60-5 are joined and a group is formed from BBUs 50-1, 50-3, and BBU 50-4.

FIG. 3 is a block diagram of an example of a single BBU 50 and is used for illustration purposes. FIG. 3 is used to describe logical blocks and actual implementation of a baseband unit may be quite different from that shown. FIG. 3 shows a BBU 50 (50-2 in this example). Each receiver 305 includes RRH interface hardware 320, which is connected to a link 70. Each receiver 305 also includes baseband processing hardware 330, which is connected to a NW I/F 350, connected to link 60. The RRH interface hardware 320 includes a memory 323 and a processor 325. Certain functions, such as signal processing 324, may be performed via computer program code (e.g., stored in memory 323) that are executed on the processor 325, or performed in hardware elements (i.e., via gates, instruction and data paths, registers, and the like, e.g., as part of processor 325 and/or another integrated circuit, to carry out the signal processing actions in signal processing 324). The signal processing functions may include SINR calculations, for instance.

The baseband processing hardware 330 comprises a memory 333 and a processor 335. The memory includes computer program code including a scheduler 340, an AMU 345, and an IRC function 334. These functions may be performed entirely via computer program code in memory 333, or may also be performed in hardware elements. In particular, some or all of the IRC may be performed via computer program code (e.g., in memory 333) that are executed on the processor 335 or via hardware elements (i.e., via gates, instruction and data paths, registers, and the like, e.g., as part of processor 335 and/or another integrated circuit, to carry out the appropriate functions in any one or more of the scheduler 340, AMU 345, or IRC function 334).

The backhaul NW I/F 370 communicates over backhaul link 80, which may be, e.g., an Ethernet link. It is assumed herein that the baseband processing hardware 330-1, 330-2 can communicate with each other and the backhaul NW I/F 370 via one or more buses 391. Other buses and interconnections are shown in FIG. 3 and many are not shown. These are known to those skilled in the art.

The memories 323/333 may be of any type suitable to the local technical environment and may be implemented using any suitable data storage technology, such as semiconductor based memory devices, magnetic memory devices and systems, optical memory devices and systems, static memory, dynamic memory, fixed memory and removable memory. The memories 323/333 may reside at least on part on a corresponding processor 325/335. Some portion of the memories 323/333 may be accessible between receivers 305 (e.g., for shared memory such as for a shared version of the table 410 shown in FIG. 4). The processors 325, 335 may be of any type suitable to the local technical environment, and may include one or more of general purpose computers, special purpose computers, microprocessors, digital signal processors (DSPs) and processors based on a multi core processor architecture, as non limiting examples. A typical implementation is that the processors 325, 335 are implemented using DSPs, so the implementation in FIG. 3 is a two-DSP (per receiver/cell) implementation. There could be implementations using three to six or more DSPs. Also, the functionality shown is merely for ease of reference and should not be construed to be limiting. For instance, in some implementations, a function such as a scheduler 340 could be implemented using multiple DSPs in a single receiver 305.

FIG. 3 shows that at least (I, Q) values are received from a corresponding RRH 40, and the (I, Q) values are processed by the AMU 345. The receiver 305 (e.g., AMU 345) redistributes the (I, Q) values via a corresponding link 60.

Figure 4:
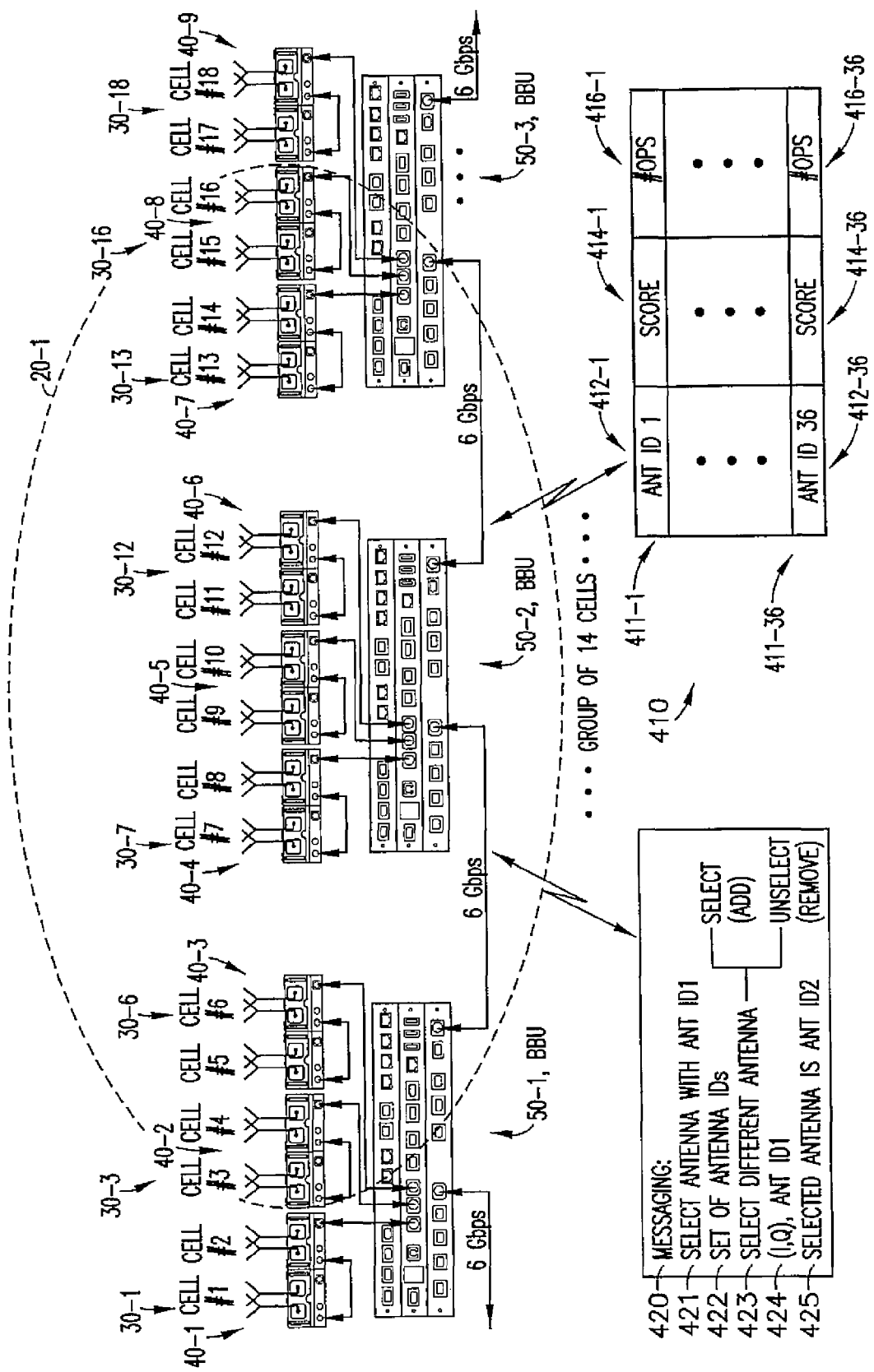
FIG. 4 is an example of a scalable baseband grouping apparatus.

Turning now to FIG. 4, this figure shows an example of a scalable baseband grouping apparatus. In this apparatus, six cells are directly connected to each BBU 50 for a group 20-1. Each BBU 50 has access to 10 cells (20 antennas) through its immediate neighbors (i.e., BBU 50-2 can access 10 antennas from BBU 50-1 and 10 antennas from BBU 50-3). There is a three DSP (digital signal processor) per cell (i.e., per receiver 305) deployment (Scheduler, downlink, and uplink each implemented on one of the DSPs in an example). This apparatus enables cooperative transmitter/receiver algorithms. As with FIG. 2, the cells 30 are spatially distributed in the stadium. However, in this example, each RRH 40 can support two cells 30, each cell has two dedicated antennas for diversity purposes, where each antenna can transmit and receive using either TDD or FDD duplex operation. Therefore in this example, the RRH is capable of supporting four antennas total. Each BBU 50 could have, e.g., six AMUs 345, one AMU per set of antennas 35. It is noted that each transmit antenna may be used for reception. The four antennas may be daisy chained on a single fiber. In an example, in uplink, 8rx IRC (i.e., an IRC of order k=8) is performed by a corresponding receiver 305 on the best (as selected by an aperture processing receiver) four cells out of N=14 cells. In this example, each BBU 50 has access to 36 (e.g., M, where k<N<M) antennas. However, due to bandwidth limitations (of 6 Gbps via links 60), only 14 cells (28, N, antennas) could be simultaneously used. In an example, downlink is 2×2 MIMO using cooperative downlink with joint transmission.

FIG. 4 also shows some additional examples. Each AMU 345 in the BBU 50-2 may have access to the antenna table 410, which includes an entry 411 for each of the 36 antennas 35. As shown below in FIG. 6, in certain exemplary embodiments, there is a real-time loop and a slow adaptation loop for selecting antennas. When the real time loop selects k out of N antennas, each AMU runs its table 410 independently, and its local memory is not shared with other AMUs. However, each AMU has also a slow adaptation loop to handle, and this process typically uses shared memory. Each AMU can contribute new data into a shared memory table 410, and the AMUs all read the same results, and therefore reach the same conclusion of which N out of M antennas to select. Each entry 412 includes an antenna identification (ID) (Ant ID) 412, a score 414, and a number of opportunities 416. The antenna identification uniquely addresses one of the antennas 35. Each of the scores 414 (described in more detail below) that provides an indication how well the antenna performs for a particular cell 30 using SINR as the metric in an example. That is, each AMU 345/receiver 305 in the BBU 50-2 can choose any 28 of the 36 total antennas (e.g., or any 14 of the 18 cells). The AMU 345/receiver 305 uses the score 414 as a criterion to determine which antennas 35/cells 30 should be chosen. For instance, upon cold restart, an AMU 345/receiver 305 may choose to use the 14 cells 30-3 to 30-16. Based on scores 414 for these cells and on a slow adaptation time period, the cell 30-17 may be chosen and the cell 30-16 dropped. That is, the exact 14 cells (of 18 cell) or 28 antennas (of 36 antennas) chosen to receive UE transmissions may vary over time. From the 14 cells or 28 antennas, four cells or 8 antennas are chosen (in an example) for the IRC calculation for a particular UE. The number of opportunities 416 is based on the number of times the corresponding antenna is used as one of the chosen N antennas. In one example, the scores 414 are not divided by the number of operations 416, so that an average can be determined by taking a score 414 divided by the number of operations 416. In another example, the scores 414 can be an average score for the number of operations 416. In a further example, if an antenna is not selected as one of the N antennas, a zero value for a score will be added to the score 414. That is, only those selected antennas would get a zero value for a score 414 while also having a number of operations increase by one. This is an attempt to not "punish" the antennas that are not being used. In another embodiment, an antenna that is not selected as one of the N antennas does not receive a value for the score 414 or an increase in number of operations 416. This is an attempt to reduce scores for those antennas with a small number of operations 416. These implementations are merely exemplary, and many other options for determining scores 414 to use to determine which of the N antennas to select from M antennas may be used.

FIG. 4 also shows exemplary messaging 420 between BBUs 50-1 and 50-2. For instance, the BBU 50-2 can send a message 421 indicating that the antenna with antenna identification "ID1" should be selected by the BBU 50-1. The BBU 50-1 will then send received information from this antenna to the BBU 50-2. A cell ID may also be used so that a cell (two antennas) may be selected. There may also be communication of scores 414 (and possibly number of opportunities 416) between BBUs. For instance, message 422 is a message from the BBU 50-2 to the BBU 50-1 indicating a set of antenna IDs the BBU 50-1 should select and use. That is, the BBU 50-1 only needs to know a list (as in the message 422) of desired 8 antennas and their antenna IDs (e.g., "Ant-ID") so that the BBU 50-1 could share the received information from these antennas with BBU 50-2. The other 8 antennas come from the other neighbor, BBU 50-3, and another 12 directly from BBU 50-2. In message 423, the BBU 50-2 directs the BBU 50-1 to select a different antenna (e.g., for use as one of the N antennas), and in message 425, the BBU 50-1 responds with an indication the selected antenna has antenna ID of "ant ID2". Message 242 is a message of (I, Q) data and a corresponding antenna ("ant ID1").

Figure 5:
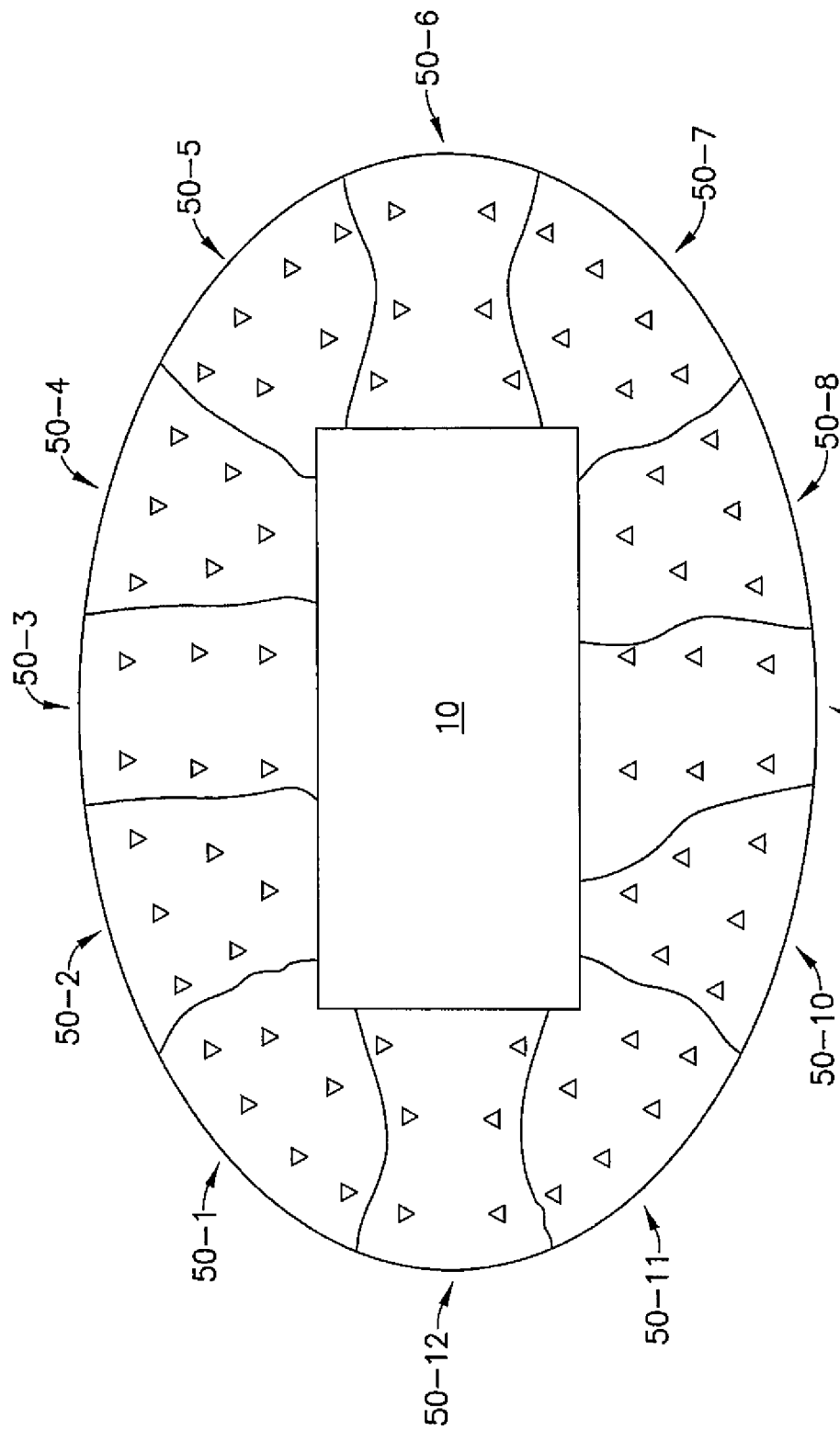
FIG. 5 is an example of a scalable baseband grouping apparatus where 12 BBUs support 72 cells.

Referring now to FIG. 5, an example is shown of a scalable baseband grouping apparatus where 12 BBUs 50-1 through 50-12 support 72 cells. Each group of cells (each cell is illustrated by a triangle) is directly attached to the same BBU 50. Each BBU has access to the signals from all of its own cells plus the signals from the cells of the two adjacent groups (14 cells total, 28 antennas due to the exemplary bandwidth restrictions described above with respect to FIG. 4). 72 UEs can be scheduled simultaneously. Each BBU 50 uses the antennas of the best four cells for reception.

Figure 6:
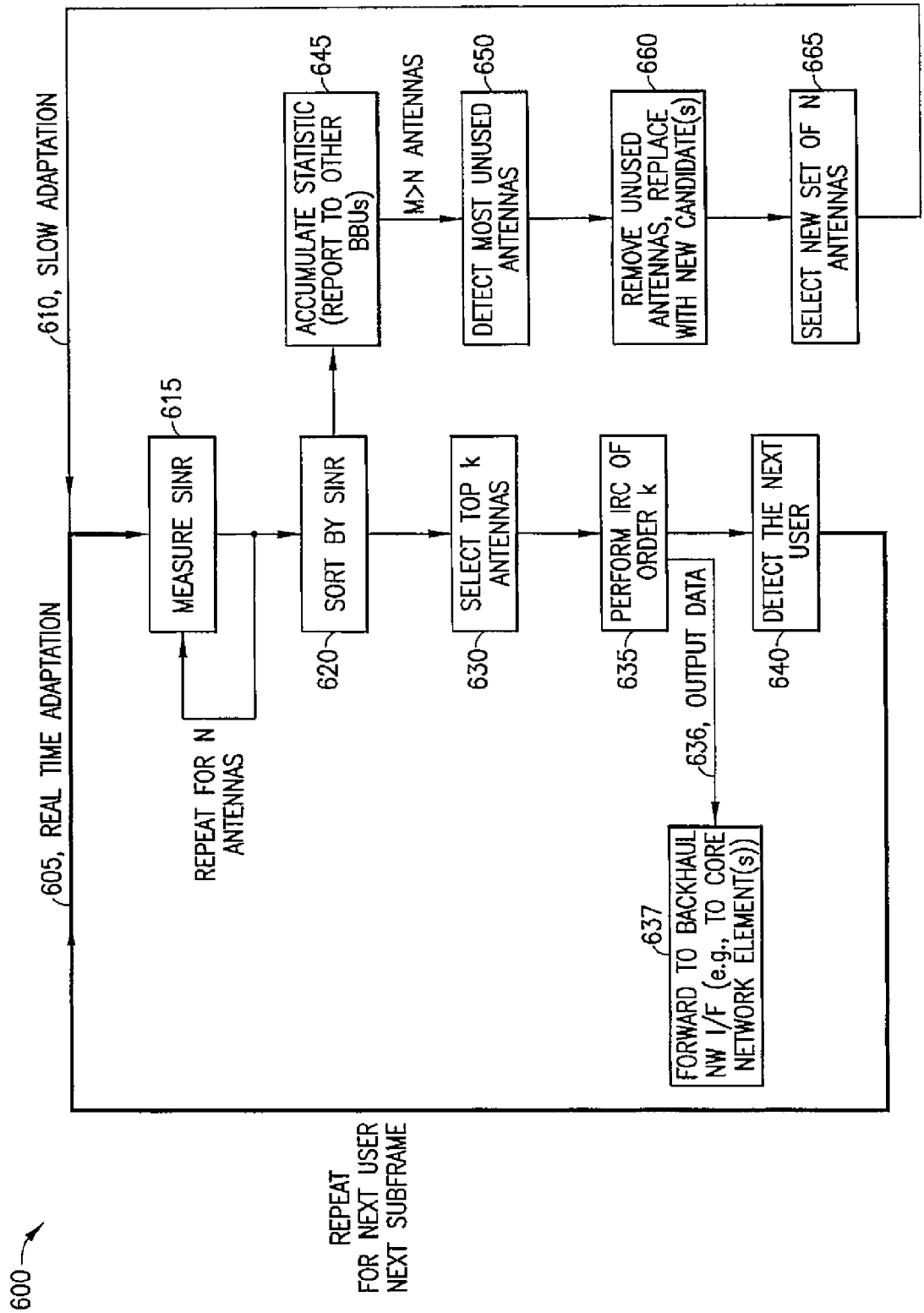
FIG. 6 is a flowchart of an exemplary method for cell grouping and aperture selection.

FIG. 6 is a flowchart of an exemplary method 600 for cell grouping and aperture selection. FIG. 6 is performed by a receiver 305 (e.g., an AMU 345 in the receiver) that is an aperture processing receiver in a group 20. The method 600 may be performed by computer program code (e.g., executed by a processor) or performed by hardware elements, or some combination of these. There are two paths 605, 610. One path 605 is a real-time adaptation path 605, which is typically performed in fractions of a second (per UE). The other path 610 is a slow adaptation that is performed, e.g., per cell over the course of hours, days, weeks, or months and is for all users, per a cell. As mentioned before, the slow adaptation process may use shared memory that is shared between all AMUs on the same BBU.

In block 615, the receiver 305 measures (e.g., pre-combined) SINR for received information from one of the N antennas (in FIG. 2, N is 12). Other possible metrics include received signal strength, sounding (SRS, sounding reference signals), and the like, which may be combined with or used in lieu of SINR. It is noted that the scheduler 340 will inform the AMU 345 of when the UE 110 is to send uplink data and on what (set of) resource(s). The AMU 345 is therefore measuring that (set of) resource(s) for that specific user (UE 110) in the received information from the antenna 35. In the example of FIG. 3, the AMU 345 may perform the SINR measurement, or have the signal processing 324 perform the SINR measurement (e.g., based on data sent from the AMU 345 to the signal processing 324 for the N antennas). Block 615 is repeated for received information from N antennas.

In block 620, the receiver 305 sorts the N antennas by SINR and sends the sorted SINR to block 645. In an exemplary embodiment, the N antennas are scored so that a score of 1 (one) is worst and N is best in terms of the metric. In an example, the scores are stored as the scores 414 described above in reference to FIG. 4. In block 630, the receiver 305 selects the top k antennas 35 (i.e., selects the antennas associated with the k highest SINR values). The k antennas define the aperture. In block 635, the receiver performs an IRC of order k using the received information from the k antennas 35. In an example, the AMU 345 can have the IRC 334 perform the IRC of order k. The IRC of order k produces output data 636 that can then be forwarded to the backhaul NW I/F 370 (e.g., after decoding and any additional processing if necessary, placement into packets, and the like). In block 640, the next user is detected so that the next User-ID is loaded. Block 640 would be performed for all the users (e.g., UEs 110) having scheduled uplink transmissions for a particular cell in that specific subframe of a timeslot.

For the slow adaptation path 610, in block 645, the receiver 305 (e.g., AMU 345) accumulates statistics. It is noted that the accumulation of statistics is for all users and for a single cell and for M antennas (M>N). In FIG. 4, for instance, there are 36 possible antennas and statistics may be accumulated for the 36 (e.g., M) antennas, even though only 28 (e.g., N) are used to receive information from UEs. In block 650, the receiver 645 detects the most unused antennas (e.g., an antenna in an exemplary embodiment is unused if the SINR for all users over a time period is beneath a threshold or one or more other criteria). In block 660, the unused antennas are removed from the original set of N antennas and are replaced with new candidate antennas. In one exemplary embodiment, one single antenna (or cell) is removed and that antenna (or those antennas connected to a cell) is removed. In a system such as the one shown in FIG. 2, there would only be physical connections between neighboring BBUs. So BBU2 would only have a physical link connection to BBU1 and BBU3. However, depending on the cell bandwidth, there may be enough (e.g., fiber) bandwidth in the daisy chained links for, e.g., BBU4 data to also be passed to BBU2. In the case of FIG. 4, there are 36 antennas, but only 24 of those are selected due to bandwidth considerations.

In block 665, the receiver 305 selects the new set of N antennas out of M. The FIG. 6 flow chart represents a more generic approach (than that shown in FIG. 2, for instance) that is better suited to an architecture that has, e.g., fiber switches in place. Fiber switches would help remove some of the restrictions that a daisy chain architecture (as shown in FIGS. 2 and 4) places upon antenna data access. In such a fiber-switched architecture, one could envision the switch connections dynamically updated by the process of blocks 660 and 665. Fiber-switching is merely exemplary and other types of architectures may be used.

Figure 7:
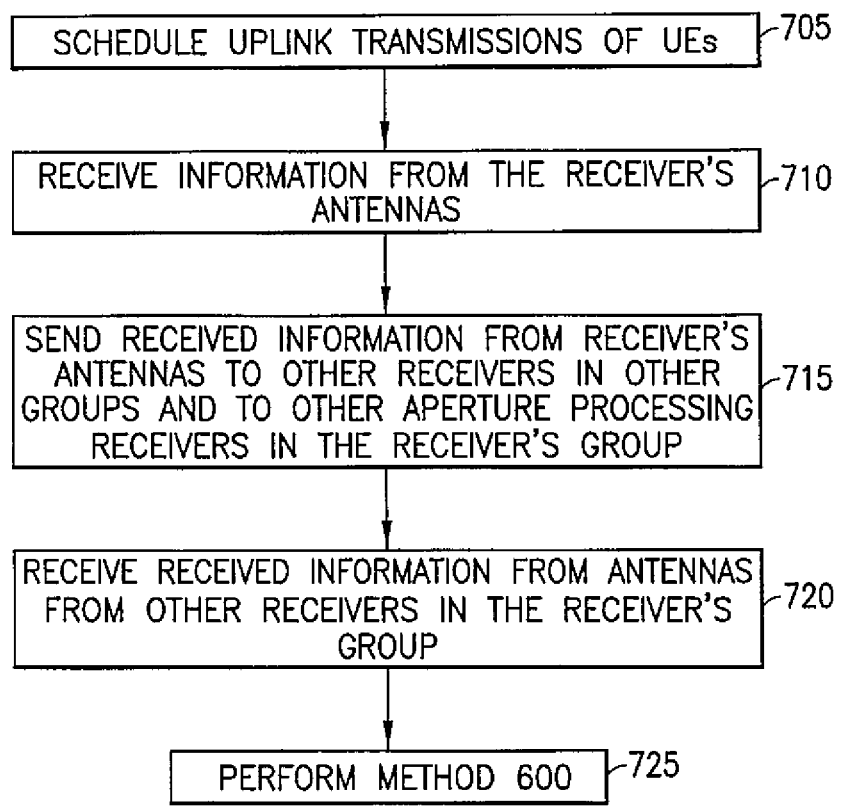
FIG. 7 is a flowchart of a method that is performed by a receiver for processing to support cell grouping and aperture selection.

Turning now to FIG. 7, a flowchart of a method is shown that is performed by a receiver for processing to support cell grouping and aperture selection. The method is performed by an aperture processing receiver (e.g., receiver 305-1 for cell 30-3 in FIGS. 2 and 3). In block 705, the receiver 305 schedules uplink transmissions of UEs. The scheduling may be performed by scheduler 340 and provided, e.g., to AMU 345. In block 710, the receiver 305 receives information from the receiver's antennas 35. In an example, the (I, Q) values are received by the receiver 305 via the link 70. In block 715, the receiver 305 sends the received information from the receiver's antennas 35 to other receivers in other groups and to other aperture processing receivers. For instance, in FIG. 2, the receiver 305-1 in cell 30-3 is an aperture processing receiver for group 20-1 and the receiver 305-1 sends the received information from each of antennas 35-31 and 35-31 to the other aperture processing receiver 305-2 in cell 30-4 and also to the receivers 305 in cells 30-5, 30-6, 30-7, and 30-8 for group 20-2.

In block 720, the receiver receives received information from antennas from other receivers in its group. For instance, in FIG. 2, the receiver 305-1 in cell 30-3 is an aperture processing receiver for group 20-1 and the receiver 305-1 receives information from receivers in the cells 30-1, 30-2, 30-4, 30-5, and 30-6. In block 725, method 600 is performed so that uplink transmissions from all UEs are examined. The method in FIG. 7 is performed each time one or more UEs are scheduled for uplink transmissions (and those transmissions have occurred).

Figure 8:
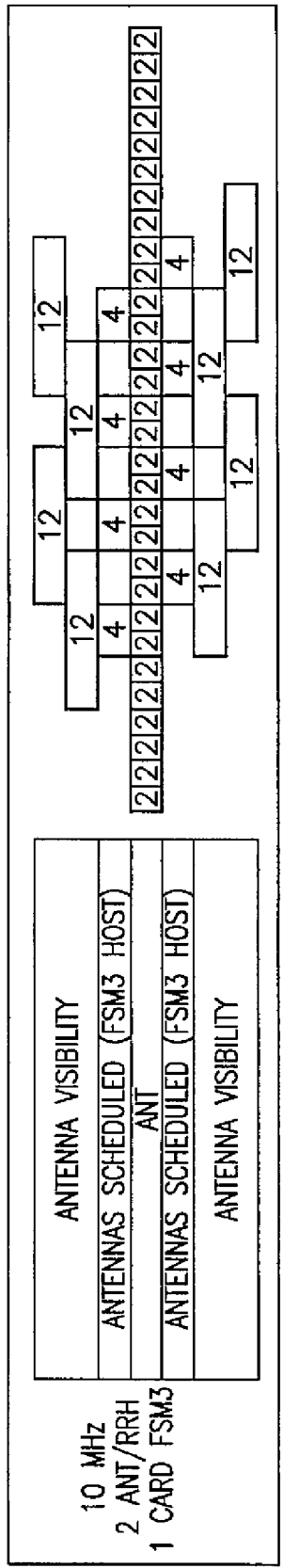
FIG. 8 is a block diagram of conceptual operation of the apparatus of FIG. 2.
Figure 9:
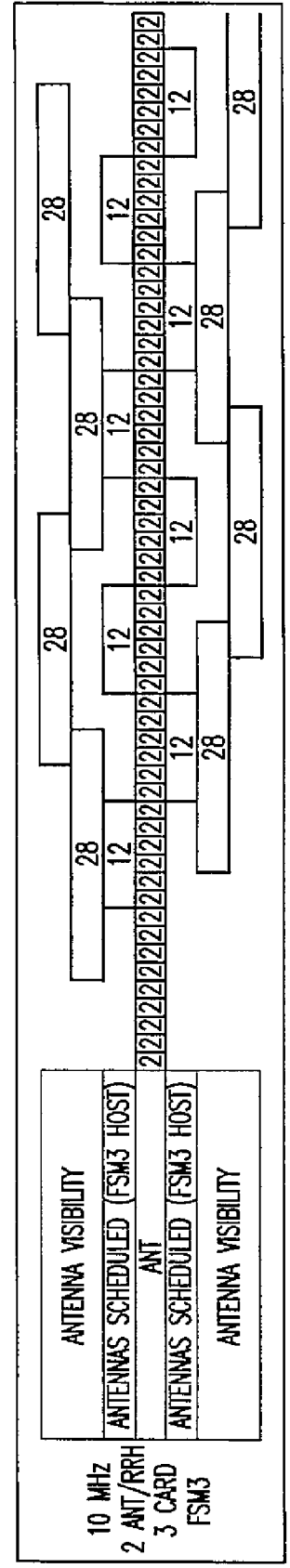
FIG. 9 is a block diagram of conceptual operation of the apparatus of FIG. 4.

Turning now to FIG. 8, a block diagram is shown of conceptual operation of the apparatus of FIG. 2. FIG. 9 shows a block diagram of conceptual operation of the apparatus of FIG. 4. These block diagrams should help simplify the analysis. FIG. 8 represents the plan from FIG. 2, while FIG. 9 represents the plan from FIG. 4. The "FSM3 Host" represents where a given cell is scheduled and received. The FSM3 is a product offering from Nokia Siemens Networks corresponding to a BBU 50. The "Antenna Visibility" shows the "Group" of RRHs to which a corresponding receiver has visibility.

For instance, in FIG. 8, for an FSM3 Host, four antennas (from two RRHs 40, each with two antennas, see FIG. 2) can be scheduled and received, and each receiver has visibility to 12 antennas. In the example of FIG. 9 (and corresponding FIG. 4), for an FSM3 Host, twelve antennas (from three RRHs 40, each with four antennas, see FIG. 4) can be scheduled and received and each receiver has visibility to 28 antennas.

It is noted that the AMUs shown above are shown in each receiver. However, an AMU may be distributed (e.g., not be independent) in each receiver or some subset of receivers/BBUs. Also, the AMU may be centralized. Such embodiments could allow disseminating frequency domain, per-user knowledge. For instance, the AMU may be migrated to the BBU layer and the AMU may also further be distributed and check pointed amongst clustered AMUs (even at the scheduler-level).

The following are examples of the disclosure provided above. In an exemplary embodiment, a method and apparatus (and program produce) are disclosed to dynamically select a set of "best" antennas out of a number of possible antennas for a specific user based on real-time channel conditions. Additionally, long term statistics may be collected and analyzed to redefine future grouping choices for a given cell based on traffic history. The statistics may be based on SINR or any other suitable metric, such as received signal strength, sounding (SRS, sounding reference signals), and the like, which may be combined with or used in lieu of SINR. In another exemplary embodiment, a method is disclosed that combines a multi-antenna receiver and (fast or slow) (e.g., digital) aperture selection.

In a further exemplary embodiment, a method is disclosed that includes selecting a first plurality (e.g., k) of antennas from a second (e.g., N) plurality of antennas connected to a plurality of receivers, and determining output data from a user equipment using the first plurality of antennas. A number of the second plurality of antennas may be larger than a number of the first plurality of antennas (e.g., N>K). The user equipment may perform a transmission that is received at each of the second plurality of antennas. The method may be performed by one of the plurality of receivers. The plurality of receivers may be connected to a plurality of remote radio heads forming corresponding cells using corresponding ones of the plurality of antennas. There may be multiple antennas per cell.

Determining the output data may include performing an IRC having an order (e.g., k) equivalent to a number of the first plurality of antennas on received information from the first plurality of antennas. The received information may include (I, Q) values. The selecting and determining may be performed for a plurality of user equipment. The plurality of user equipment may be attached to a cell and the cell attached to a corresponding receiver that performs the method.

The selecting may include selecting the second (e.g., N) plurality of antennas from a third (e.g., M) plurality of antennas connected to an additional plurality of receivers. The selecting of the first plurality of antennas may be based on one or more metrics such as SINR, received signal strength, or sounding (e.g., SRS, sounding reference signals) metrics. Values of the one or more metrics may be accumulated (e.g., on a per-antenna, per-cell basis) over some period of time (e.g., hours, days, weeks) as statistics. The statistics may be analyzed (e.g., at periodic intervals of, e.g., hours, days, weeks) to detect antennas that are deemed to be unused. The antennas may be deemed unused because the values of the one or more metrics do not meet one or more predetermined criteria. The unused antennas may be removed from the second (e.g., N) plurality of antennas and other candidate antennas from the third (e.g., M) plurality of antennas may be used to form the second (e.g., N) plurality of antennas. That is, new candidate antennas may be added to the second (e.g., N) plurality of antennas to replace the removed unused antennas. Values of the one or more metrics for the new candidate antennas may be accumulated and used in a subsequent operation that reselects the second (e.g., N) plurality of antennas from the third (e.g., M) plurality of antennas.

An antenna management unit may be implemented on at least one receiver, and wherein the plurality of antenna management units communicate (e.g., using link 60), which may also be implemented in a distributed and check-pointed manner or in a master antenna management unit amongst one or more groups of cells.

An apparatus may perform the method. The apparatus may include one or more memories comprising computer program code and may include one or more processors. The one or more memories and the computer program code may be configured to, with the one or more processors, cause the apparatus to perform any of the previously described method operations. Additionally, a computer program product can include a computer-readable medium bearing computer program code embodied therein for use with a computer. The computer program code may include code for performing any of the method operations described above.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memories 323, 333 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
accessing baseband information for a plurality, N, of antennas accessible by a plurality of baseband units, the baseband information corresponding to a transmission by a user equipment and received at the N antennas;
determining values for one or more metrics for the baseband information for each of the N antennas individually, wherein the one or more metrics is signal-to-interference noise ratio;
selecting, based on the determined values, a subset k of the N antennas and corresponding baseband information to use to determine output data for the transmission by the user equipment; and
determining the output data for the user equipment using the baseband information from the k antennas.

2. The method of claim 1, wherein the plurality of baseband units and the N antennas form a plurality of cells.

3. The method of claim 2, wherein the plurality of baseband units can access M antennas, M>N, and the plurality of baseband units and the M antennas form a plurality of cells greater in number and incorporating the plurality of cells formed by the N antennas.

4. The method of claim 2, wherein there are a plurality of remote radio heads that are intermediate the baseband units and the antennas, wherein each remote radio head is coupled to one or more of the antennas and forms a corresponding cell with the one or more antennas, and wherein each baseband unit is coupled to a plurality of the remote radio heads.

5. The method of claim 3, wherein:
the accessing the baseband information, determining values, and selecting the subset k of N antennas performs a selection of an antenna apertures for a transmission by the user equipment;
the N antennas are a current set of N antennas;
the method further comprises accessing accumulated statistics corresponding to the determined values for baseband information for each of the M antennas individually;
the accumulated statistics are for transmissions by a plurality of user equipment attached to one of the cells and received at the M antennas; and
the method further comprises, based on the accumulated statistics, selecting a new set of N antennas to use for subsequent selections of antenna apertures for transmissions by user equipment attached to the one cell.

6. The method of claim 5, further comprising performing the subsequent selections of antenna apertures for transmissions by user equipment attached to the one cell and determining output data for the transmissions by the user equipment based on the apertures.

7. The method of claim 5, wherein selecting the new set of N antennas further comprises:
detecting, using the accumulated statistics, a set of antennas that are most unused in the current set of N antennas relative to other antennas in the current set of N antennas;
removing the set of most unused antennas from the current set of N antennas;
replacing the set of most unused antennas with a set of candidate antennas from the M.

8. The method of claim 1, wherein selecting further comprises selecting the baseband information and corresponding antennas from the N antennas having highest k values of signal-to-interference noise ratios.

9. The method of claim 1, wherein using the baseband information from the k antennas to determine the output data for the user equipment further comprises performing interference rejection combining of order k on the baseband information corresponding to the k antennas.

10. A computer program product embodied on a non-transitory computer-readable memory medium in which computer program code is stored that, when being executed by a computer, is configured to provide instructions to control or carry out:
accessing baseband information for a plurality, N, of antennas accessible by a plurality of baseband units, the baseband information corresponding to a transmission by a user equipment and received at the N antennas;
determining values for one or more metrics for the baseband information for each of the N antennas individually, wherein the one or more metrics is signal-to-interference noise ratio;
selecting, based on the determined values, a subset k of the N antennas and corresponding baseband information to use to determine output data for the transmission by the user equipment; and
determining the output data for the user equipment using the baseband information from the k antennas.

11. An apparatus, comprising:
one or more processors; and one or more memories including computer program code, wherein the one or more memories and the computer program code are configured, with the one or more processors, to cause the apparatus to perform or control at least the following:
accessing baseband information for a plurality, N, of antennas accessible by a plurality of baseband units, the baseband information corresponding to a transmission by a user equipment and received at the N antennas;
determining values for one or more metrics for the baseband information for each of the N antennas individually, wherein the one or more metrics is signal-to-interference noise ratio;
selecting, based on the determined values, a subset k of the N antennas and corresponding baseband information to use to determine output data for the transmission by the user equipment; and
determining the output data for the user equipment using the baseband information from the k antennas.

12. The apparatus of claim 11, wherein the plurality of baseband units and the N antennas form a plurality of cells.

13. The apparatus of claim 12, wherein the plurality of baseband units can access M antennas, M>N, and the plurality of baseband units and the M antennas form a plurality of cells greater in number and incorporating the plurality of cells formed by the N antennas.

14. The apparatus of claim 12, wherein there are a plurality of remote radio heads that are intermediate the baseband units and the antennas, wherein each remote radio head is coupled to one or more of the antennas and forms a corresponding cell with the one or more antennas, and wherein each baseband unit is coupled to a plurality of the remote radio heads.

15. The apparatus of claim 13, wherein:
the accessing the baseband information, determining values, and selecting the subset k of N antennas performs a selection of an antenna apertures for a transmission by the user equipment;

the N antennas are a current set of N antennas;

the one or more memories and the computer program code are further configured, with the one or more processors, to cause the apparatus to perform accessing accumulated statistics corresponding to the determined values for baseband information for each of the M antennas individually;

the accumulated statistics are for transmissions by a plurality of user equipment attached to one of the cells and received at the M antennas; and the one or more memories and the computer program code are further configured, with the one or more processors, to cause the apparatus to perform, based on the accumulated statistics, selecting a new set of N antennas to use for subsequent selections of antenna apertures for transmissions by user equipment attached to the one cell.

16. The apparatus of claim 15, further comprising performing the subsequent selections of antenna apertures for transmissions by user equipment attached to the one cell and determining output data for the transmissions by the user equipment based on the apertures.

17. The apparatus of claim 15, wherein selecting the new set of N antennas further comprises:
   detecting, using the accumulated statistics, a set of antennas that are most unused in the current set of N antennas relative to other antennas in the current set of N antennas;
   removing the set of most unused antennas from the current set of N antennas;
   replacing the set of most unused antennas with a set of candidate antennas from the M antennas to form the new set of N antennas.

18. The apparatus of claim 11, wherein each antenna is uniquely identified.

19. The apparatus of claim 11, wherein the one or more metrics comprise one or more of received signal strength, sounding reference signals, or signal-to-interference noise ratio.

20. The apparatus of claim 11, wherein selecting further comprises selecting the baseband information and corresponding antennas from the N antennas having highest k values of signal-to-interference noise ratios.

21. The apparatus of claim 11, wherein using the baseband information from the k antennas to determine the output data for the user equipment further comprises performing interference rejection combining of order k on the baseband information corresponding to the k antennas.

22. The apparatus of claim 11, wherein the user equipment is one of a plurality of user equipment, and wherein the one or more memories and the computer program code are further configured, with the one or more processors, to cause the apparatus to perform performing the accessing baseband information, determining values and selecting the subset k antennas to determine output data for each of the plurality of user equipment.

23. The apparatus of any of the preceding apparatus claims, wherein the baseband information comprises (I, Q) information.

* * * * *